United States Patent [19]
Cox et al.

[11] Patent Number: 5,008,829
[45] Date of Patent: Apr. 16, 1991

[54] PERSONAL COMPUTER POWER SUPPLY

[75] Inventors: Roger L. Cox, Plantation; Michael J. DeLoye, Boynton Beach; Robert L. Myers, Boca Raton, all of Fla.

[73] Assignee: International Business Machines Corporation, Armonk, N.Y.

[21] Appl. No.: 536,751

[22] Filed: Jun. 14, 1990

[51] Int. Cl.$^5$ .............................. G06F 15/20
[52] U.S. Cl. ............................... 364/480; 363/84; 363/125
[58] Field of Search ............. 363/84, 125, 98; 364/480

[56] References Cited

U.S. PATENT DOCUMENTS 4,873,618 10/1989 Frederick et al. .................. 363/98

Primary Examiner—Salvatore Cangialosi
Attorney, Agent, or Firm—Daniel E. McConnell

[57] ABSTRACT

This invention relates to personal computers, and more particularly to personal computer power supplies for supplying electrical power to electrically operated components which manipulate or store digital data. The power supply has a controllable component for responding to the presence and absence of a low voltage direct current electrical signal by enabling and disabling the supply of electrical power to the data processing and storage components, and a signal generator circuit operatively connected with the controllable component and with an alternating current electrical main supply for controllably deriving from the main supply a low voltage direct current signal for delivery to the controllable component, whereby a user of the microcomputer may control energization of the electrically powered data processing and storage components by controlling the application of the low voltage direct current signal from the signal generator circuit to the controllable component.

10 Claims, 4 Drawing Sheets

PERSONAL COMPUTER POWER SUPPLY

FIELD AND BACKGROUND OF INVENTION

This invention relates to personal computers, and more particularly to personal computer power supplies for supplying electrical power to electrically operated components which manipulate or store digital data.

Personal computer systems in general and IBM personal computers in particular have attained widespread use for providing computing capability to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing capability to a single user and are inexpensively priced for purchase by individuals or small businesses. Examples of such personal computer systems are IBM's PERSONAL COMPUTER AT and IBM's PERSONAL SYSTEM/2 Models 25, 30, 50, 55, 60, 65, 70 and 80.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 80. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

Electrical power for energizing the components of such personal computers is conventionally supplied by power supplies which use control logic, switching transistors, power transformers, rectifiers and filters to convert electrical power from an available line voltage and current, such as the 110 volt 60 hertz current supplied in the United States, to the direct voltages and currents required for operation of the personal computer. It has been conventional to control operation of such power supplies by switching the supply voltage to the power supply. In the example given, such switching is accomplished by turning on and off the 110 volt 60 hertz mains supply current. As will be appreciated, such switching of the generally supplied service voltage requires switches which are at least somewhat substantial as compared to the significantly lower voltages and current typically used with the operating components of the personal computer.

It has been proposed heretofore, as in Summerlin U.S. Pat. No. 4,723,269, to use a lower level voltage to control the operation of a personal computer power supply. In the Summerlin disclosure, to which the interested reader is referred, a telephone ring detector acts through optically coupled semiconductor devices to control passage of the relatively high voltage supply current. However, such circuitry continues to require manual control over computer power to be exercised by manipulation of a relatively high voltage switch.

BRIEF DESCRIPTION OF INVENTION

With the foregoing discussion particularly in mind, it is an object of this invention to protect a user of a personal computer against unnecessary exposure to the relatively high voltages of sources of supply to the computer. In realizing this object of the present invention, provision is made for the delivery of a relatively low voltage signal which may be manually or remotely controlled to control the operation of a pulse width modulator control component in a power supply without any necessity of providing a high voltage optically isolated or electromechanical switch to directly control the mains supply voltage.

Yet a further object of this invention is to enable control over the operation of a personal computer with logic level voltage, low current, electrical signals. In realizing this object of the present invention, the possibility is opened of establishing remote control over the supply of electrical power to the operating components of a computer in a manner consistent with the manual control used by an operator.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
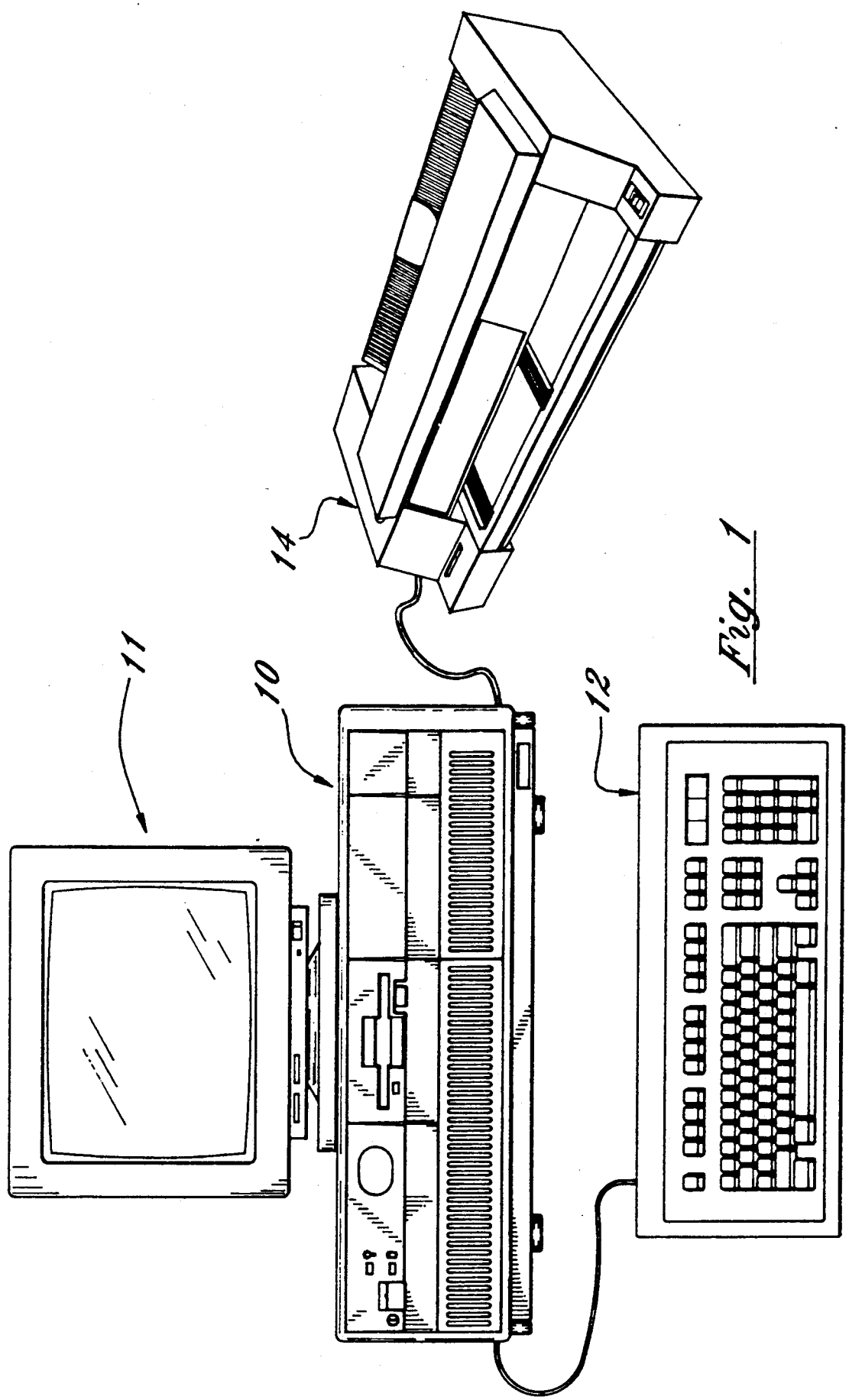
FIG. 1 is a perspective view of a personal computer embodying this invention.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a planar 20 which is mounted on the chassis 19 and provides a means for electrically interconnecting the components of the computer 10 including those identified above and such other associated elements as floppy disk drives, various forms of direct access storage devices, accessory cards or boards, and the like.

Figure 2:
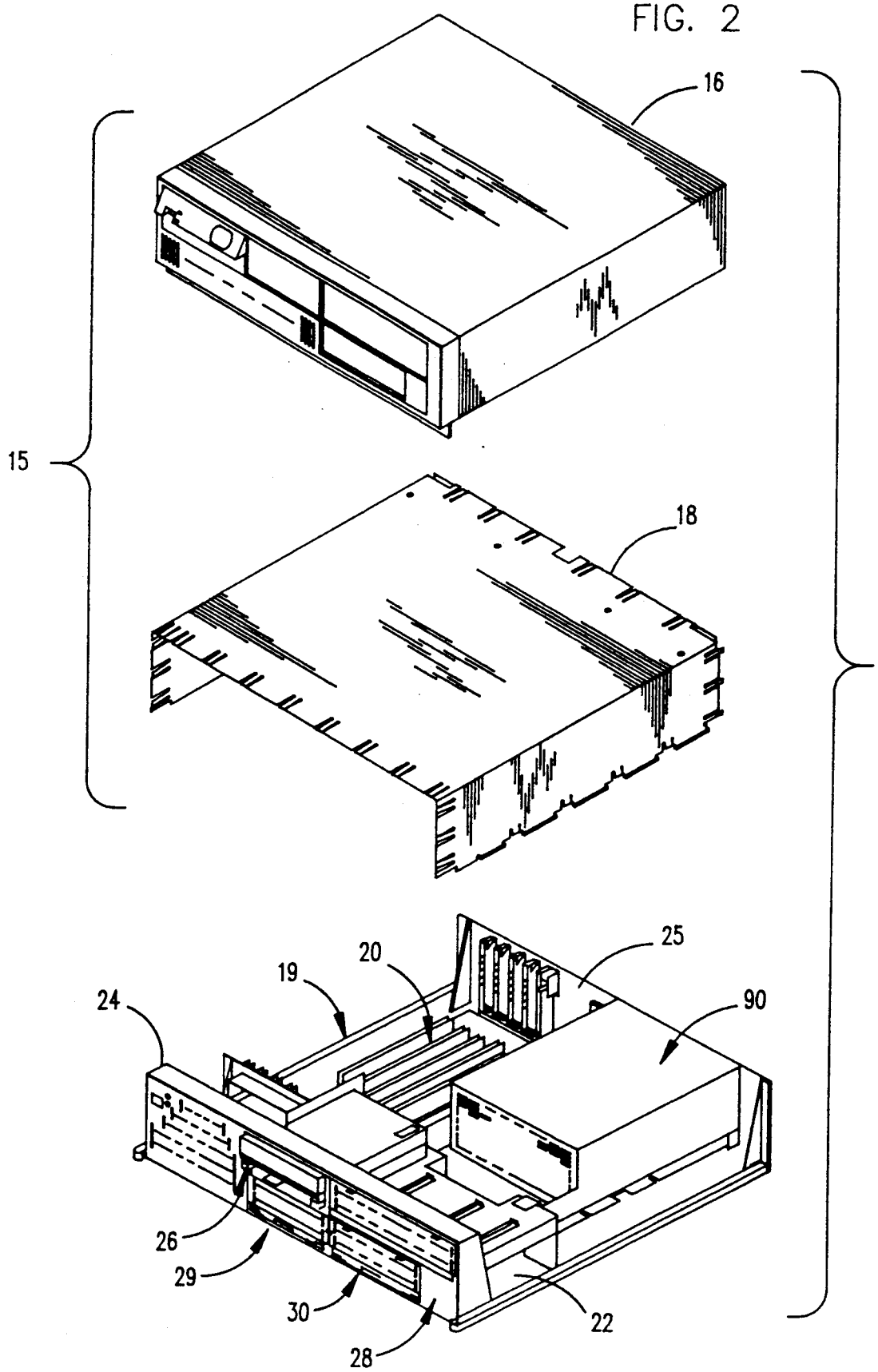
FIG. 2 is an exploded perspective view of certain elements of the personal computer of FIG. 1 including a chassis, a cover, an electromechanical direct access storage device and a planar board and illustrating certain relationships among those elements.

The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. The upper bays 26, 28 are adapted to receive peripheral drives of a first size (such as those known as 5.25 inch drives) while the lower bays are adapted to receive devices of another size (such as those known as 3.5 inch drives).

Figure 3:
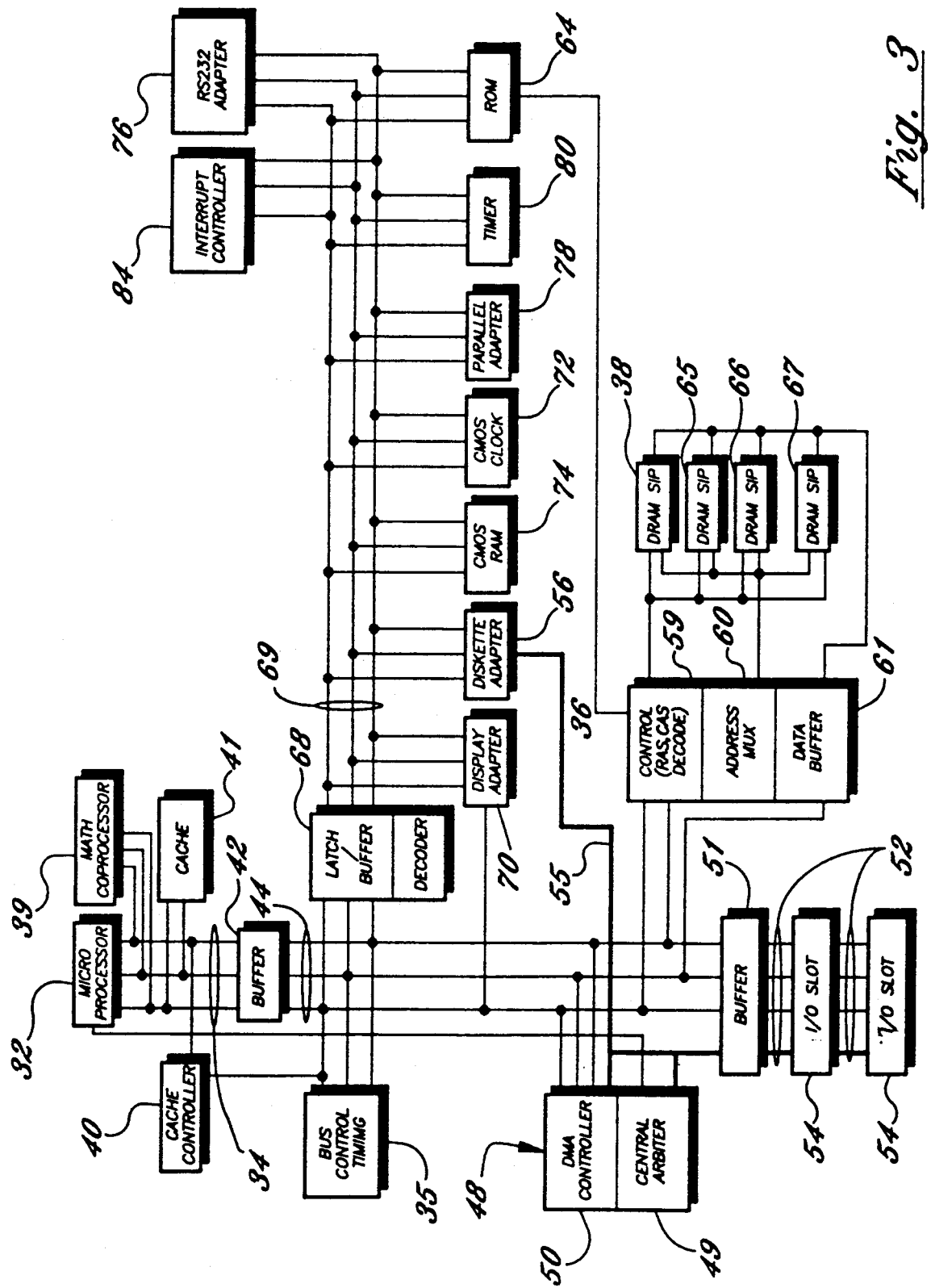
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor and the system bus could be a Microchannel or AT type.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 24 is a buffer 42. The buffer 42 is itself connected to a slower speed (compared to the CPU local bus) system bus 44, also comprising address, data and control components. The system bus 44 extends between the buffer 42 and a further buffer 51. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature bus such as the MICRO CHANNEL bus 52. Connected to the bus 52 are a plurality of I/O slots 54 for receiving MICRO CHANNEL adapter cards which may be further connected to an I/0 device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable ROM 64.

While the microcomputer system 10 is shown with a basic 1 megabyte RAM module, it is understood that additional memory can be interconnected as represented in FIG. 3 by the optional memory modules 65 through 67. For purposes of illustration only, the present invention is described with reference to the basic one megabyte memory module 38.

A further buffer 68 is coupled between the system bus 44 and a planar I/O bus 69. The planar I/O bus 69 includes address, data, and control components respectively. Coupled along the planar bus 69 are a variety of I/O adapters and other components such as the display adapter 70 (which is used to drive the monitor 11), a clock 72, nonvolatile RAM 74 herein after referred to as NVRAM, a RS232 adapter 76, a parallel adapter 78, a plurality of timers 80, a diskette adapter 56, an interrupt controller 84, and a read only memory 64. The read only memory 64 includes the BIOS that is used to interface between the I/0 devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The clock 72 is used for time of day calculations and the NVRAM is used to store system configuration data. That is, the NVRAM will contain values which describe the present configuration of the system. For example, NVRAM contains information describing the capacity of a fixed disk or diskette, the type of display, the amount of memory, time, date, etc. Of particular importance NVRAM will contain data (can be one bit) which is used by memory controller 36 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

There is also mounted within the shielded enclosure and associated with the above described components of the computer a power supply (indicated at 90 in FIG. 2) for supplying electrical power to the components of the computer 10. Preferably, and as is generally known and applied in the field of personal computers, the power supply 90 is a pulse width modulation switching power supply for connection with an alternating current electrical main supply and for supplying direct current electrical power to the data processing and storage components for enabling operation thereof. Such, power supplies have been described, for example, in "The Winn Rosch Hardware Bible", published by Brady of New York under a copyright date of 1989. As there described, power supplies of the switching type are more efficient and often less expensive than their linear kin. While designs vary, the typical switching supply first converts incoming 60 Hz utility power to a much higher frequency of pulses, in the range of 20 kHz. At the same time that the electrical current is increased in frequency, it is regulated by a digital technique known as pulse width modulation. The duration of each power pulse is varied in response to the needs of the computer circuitry being supplied. The width of the pulses is controlled by electronically switching the current flow on and off, hence the name of the technique. Such switching typically occurs in a special purpose chip designed for such a function and operating with a number of other circuit elements not here shown or described. Such description is omitted here because it is believed well known to persons of ordinary skill in the relevant arts. The pulses are reduced in voltage by a transformer and turned into pure direct current by rectification and filtering.

Switching power supplies earn their efficiency and lower cost in two ways: Switching regulation is more efficient because less power is turned into heat. Instead of dissipating energy, the switching regulator switches all current flow on and off. In addition, high frequencies require smaller, less expensive transformers and filtering circuits. Nearly all of today's personal computers use switching power supplies.

In conventional switching power supplies as described immediately above, control over whether any voltage is delivered to the operating components of the computer is exercised by turning the normal utility voltage supply on and off. In the United States, such utility mains typically supply 110 volt 60 Hz alternating electrical current. The dangers to a potential user, and the safety regulations imposed by such bodies as Underwriters Laboratories, are well known to designers of personal computers.

Figure 4:
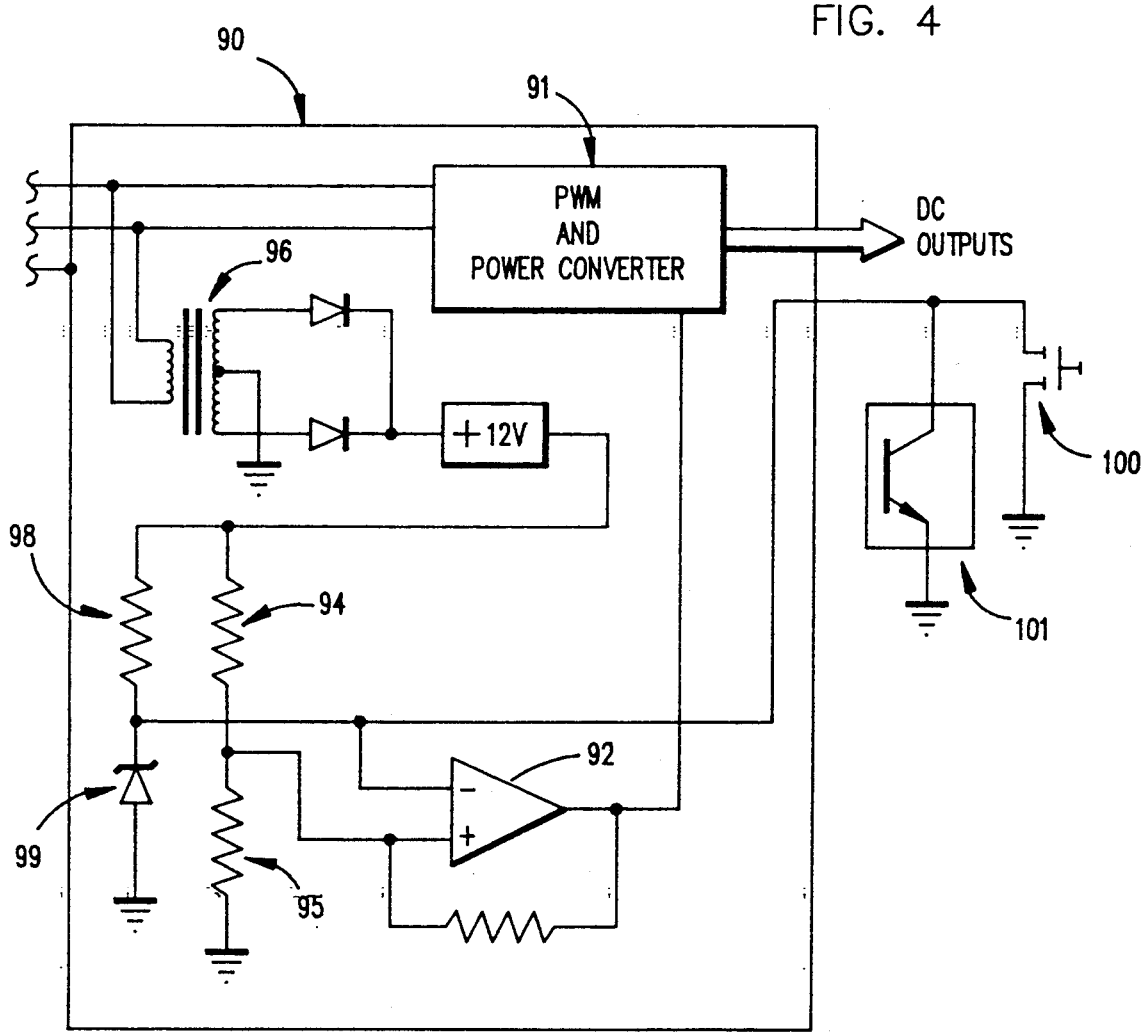
FIG. 4 is a circuit diagram of certain power supply and control elements used in the computer of FIGS. 1 through 3.

In accordance with this invention, the power supply comprises a controllable component for responding to the presence and absence of a low voltage direct current electrical signal by enabling and disabling the supply of electrical power to the data processing and storage components by controlling the "on" or "off" state of the pulse width modulator, and a signal generator circuit operatively connected with the controllable component and with an alternating current electrical main supply for controllably deriving from the main supply a low voltage direct current signal for delivery to said controllable component. By reason of this interconnection, a user of the computer may control energization of the electrically powered data processing and storage components by controlling the application of a low voltage direct current signal from the signal generator circuit to the controllable component. In the illustrated embodiment, the controllable component is a pulse width modulator control circuit (described generally hereinabove and indicated at 91 in FIG. 4) which may be of conventional form such as is available from Motorola as its SG1525A/1527A series of devices. The signal generator circuit comprises several elements, including a comparator 92 and first and second signal circuits for supplying signals to the comparator.

The comparator 92 receives from a first signal circuit a low voltage direct current reference signal established by a voltage divider 94, 95 supplied with rectified current transformed from the main supply voltage by a suitable small transformer 96. The comparator 92 also receives a controlled low voltage enable/disable signal varying between a first voltage and a second, higher voltage. The enable/disable signal is established by a regulated voltage divider formed by a resistor 98 and an associated zener diode 99, to which is connected a current drain in the form of a switch device for grounding out the point of connection between the resistor and diode. The switch device, which functions at a low, logic level voltage (typically 5 volts) as distinguished from the voltage of the main supply (typically on the order of 100 volts or more), may be in the form of a manually operable switch 100 or a computer logic operable switch 101. In either instance, operation of the switch 100 or 101 functions for selecting between the first and second voltages for the enable/disable signal. Responding to the change in voltage of signals applied, the comparator 92 either delivers a signal forward to a shutdown or inhibit pin of the control circuit 91 or does not deliver a signal and thereby controls the power delivered to the electrically powered data processing and storage components of the computer. The computer logic operable switch 101 may, for example, be associated with a telecommunications device for enabling remote control over the power on and power off states of the computer 10.

It is to be noted that the control occurs on the secondary, or output, side of the primary power transformer of the power supply, where the pulse width modulator component is connected, so that a user is isolated from dangerous voltages.

As will be appreciated, a user of the computer 10 may control the power on power off functions by manipulating the manual switch 100, and thereby use the computer while avoiding exposure to the higher voltages and currents typically supplied through the main electrical supply obtained from a power distribution company or utility. In the drawings and specifications there has been set forth a preferred embodiment of the invention and, although specific terms are used, the description thus given uses terminology in a generic and descriptive sense only and not for purposes of limitation.

What is claimed is:

1. A microcomputer comprising:
  electrically powered data processing and storage components for processing and storing digital data, and
  a pulse width modulation switching power supply for connection with an alternating current electrical main supply and for supplying direct current electrical power to said data processing and storage components for enabling operation thereof, said power supply comprising:
  a controllable component for responding to the presence and absence of a low voltage direct current electrical signal by enabling and disabling the supply of electrical power to said data processing and storage components, and
  a signal generator circuit operatively connected with said controllable component and with an alternating current electrical main supply for controllably deriving from the main supply a low voltage direct current signal for delivery to said controllable component, whereby a user of the microcomputer may control energization of the electrically powered data processing and storage components by controlling the application of said low voltage direct current signal from said signal generator circuit to said controllable component.

2. A microcomputer according to claim 1 wherein said controllable component comprises a pulse width modulator control circuit.

3. A microcomputer according to claim 1 wherein said signal generator circuit comprises a comparator, a first signal circuit for supplying to the comparator a low voltage direct current reference signal, and a controllable second signal circuit for controllably supplying to the comparator a low voltage enable/disable signal varying between a first voltage and a second, higher voltage, said comparator when supplied with said reference signal and said enable/disable signal having said first voltage delivering to said controllable component said first mentioned signal.

4. A microcomputer according to claim 3 wherein said first signal circuit comprises a voltage divider for establishing a preselected voltage level for said reference signal.

5. A microcomputer according to claim 3 wherein said second signal circuit comprises a regulated voltage divider for establishing a preselected, regulated voltage level and current drain for said enable/disable signal.

6. A microcomputer according to claim 5 wherein said second signal circuit comprises a manually operable switch for selecting between the first and second voltages for the enable/disable signal and thereby for controlling the power delivered to said electrically powered data processing and storage components.

7. A microcomputer according to claim 5 wherein said second signal circuit comprises a computer logic operable switch for selecting between the first and second voltages for the enable/disable signal and thereby for controlling the power delivered to said electrically powered data processing and storage components.

8. A microcomputer comprising:
electrically powered data processing and storage components for processing and storing digital data, and
a pulse width modulation switching power supply for connection with an alternating current electrical main supply and for supplying direct current electrical power to said data processing and storage components for enabling operation thereof, said power supply comprising:
a controllable pulse width modulator for responding to the presence and absence of a low voltage direct current electrical signal by enabling and disabling the supply of electrical power to said data processing and storage components, and
a signal generator circuit operatively connected with said controllable component and with an alternating current electrical main supply for controllably deriving from the main supply a low voltage direct current signal for delivery to said controllable component, said signal generator circuit comprising a comparator, a first signal circuit for supplying to the comparator a low voltage direct current reference signal, and a controllable second signal circuit for controllably supplying to the comparator a low voltage enable/disable signal varying between a first voltage and a second, higher voltage, said comparator when supplied with said reference signal and said enable/disable signal having said first voltage delivering to said controllable component said first mentioned signal, whereby a user of the microcomputer may control energization of the electrically powered data processing and storage components by controlling the application of said low voltage direct current signal from said signal generator circuit to said controllable component.

9. A microcomputer according to claim 8 wherein said second signal circuit comprises a regulated voltage divider for establishing a preselected, regulated voltage level and current drain for said enable/disable signal, and a manually operable switch for selecting between the first and second voltages for the enable/disable signal and thereby for controlling the power delivered to said electrically powered data processing and storage components.

10. A personal computer system having a high speed system processor compatible with application programs and operating system software designed to execute on slower speed system processors, said personal computer system comprising:
a high speed microprocessor having a real and protected mode of operation coupled to a high speed data bus;
non-volatile memory electrically coupled to a slower speed data bus;
a bus controller for providing communications between the high speed data bus and the slower speed data bus;
volatile memory electrically responsive to the high speed data bus;
a memory controller electrically coupled to said volatile memory and said non-volatile memory, said memory controller regulating communications between said volatile memory and said high speed microprocessor; and
a pulse width modulation switching power supply for connection with an alternating current electrical main supply and for supplying direct current electrical power to said data processing and storage components for enabling operation thereof, said power supply comprising:
a controllable pulse width modulator for responding to the presence and absence of a low voltage direct current electrical signal by enabling and disabling the supply of electrical power to said data processing and storage components, and
a signal generator circuit operatively connected with said controllable component and with an alternating current electrical main supply for controllably deriving from the main supply a low voltage direct current signal for delivery to said controllable component, said signal generator circuit comprising a comparator, a first signal circuit for supplying to the comparator a low voltage direct current reference signal, and a controllable second signal circuit for controllably supplying to the comparator a low voltage enable/disable signal varying between a first voltage and a second, higher voltage, said comparator when supplied with said reference signal and said enable/disable signal having said first voltage delivering to said controllable component said first mentioned signal,
whereby a user of the microcomputer may control energization of the electrically powered data processing and storage components by controlling the application of said low voltage direct current signal from said signal generator circuit to said controllable component.

* * * * *